Dec. 25, 1934.  N. PERSSON ET AL  1,985,619
REFRIGERATION
Filed Oct. 30, 1930
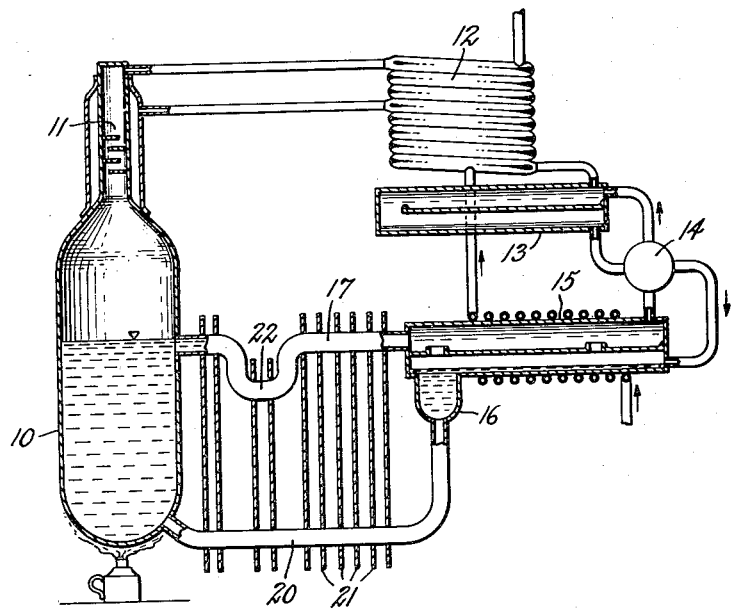
INVENTORS
Nils Persson
Sigurd Mattias Brakelius
BY
Wm. J. Hallund
their ATTORNEY Patented Dec. 25, 1934

1,985,619

UNITED STATES PATENT OFFICE 1,985,619

REFRIGERATION

Nils Persson and Sigurd Mattias Bäckström, Stockholm, Sweden, assignors, by mesne assignments, to Electrolux Servel Corporation, New York, N. Y., a corporation of Delaware Application October 30, 1930, Serial No. 492,189
In Germany January 7, 1930

3 Claims. (Cl. 62—119.5)

This invention relates to a continuous absorption refrigerating unit of the type employing a pressure equalizing gas and it is an object of the invention to provide a device of this character which is of simple and inexpensive construction and in which circulation of absorption liquid is produced by the difference in specific gravity of the hot, boiling liquid in the boiler and the cold, rich liquid in and leaving the absorber.

The invention will first be hereinafter more particularly described with reference to the accompanying drawing, which shows an elevational view, partly in section, of a refrigerating system embodying the invention, and which forms a part of this application, and the invention will be later pointed out in the claims at the end of the description.

In the drawing, 10 indicates a boiler or generator adapted to contain a cooling agent such as ammonia or the like and an absorption liquid which in the present instance may be water, such refrigerant being adapted to be expelled or caused to boil off and pass thru a rectifier 11 into a condenser 12. The vaporized refrigerant is condensed in the condenser 12 from which it flows to an evaporator 13 where it evaporates in the presence of a pressure equalizing gas, which for example may be hydrogen or the like, and such evaporation produces refrigeration. The vapor-gas mixture formed in the evaporator passes thru a temperature exchanger 14 in the usual manner to an absorber 15. In the absorber the refrigerant is absorbed by the weak absorption liquid coming from the boiler and the pressure equalizing gas being freed of the refrigerant will pass back to the evaporator.

Rich liquid in the absorber will be collected in a sump or basin 16 which is adapted to maintain a constant fluid level or quantity of fluid within the absorber and at the same time afford a reserve supply of such fluid. From the sump or basin 16 in the absorber, liquid flows thru the pipe 20 back to the lower part of the generator or boiler 10. The boiler and absorber are arranged in such manner that the pipe 20 contains a cold rich liquid during circulation between the absorber and boiler, which cold rich liquid is heated by the boiler until it reaches the boiling point and its specific gravity is decreased and it reaches a higher level in the boiler than in the absorber and flows through a pipe 17 to the absorber.

As shown, heat exchange between the liquid flowing to the boiler and the liquid leaving the boiler may be provided in a manner to afford a low resistance to the liquid circulation. In accordance with the invention the upper and lower pipes 17 and 20, thru which weak liquor flows from the boiler to the absorber and rich liquor flows from the absorber back to the boiler, are thermally connected by one or more heat conducting members 21 constructed preferably of copper, aluminum or other material having good heat conducting properties, such members being preferably soldered or otherwise intimately secured to said pipes 17 and 20 and such pipes form substantially direct connections between the boiler and absorber, the upper of which is provided with a conventional liquid seal 22. By this arrangement there is nowhere in the circulating system a rising pipe through which a cold liquid is adapted to circulate. Thus effective circulation is produced. The heat exchanger should be insulated to prevent dissipation of heat to the atmosphere.

The foregoing arrangement serves to transmit different temperatures between the tubes for progressive heating of conduit 20 and progressive cooling of conduit 17 without substantial horizontal equalization of temperature.

We claim:

1. In a refrigerating system of the class described an upright boiler, a substantially horizontal absorber having a sump at one end depending below the bottom of said absorber, a substantially horizontal pipe connecting the boiler at substantially its normal liquid level with the absorber and provided with a liquid trap, a pipe connected to and extending downwardly from the lower portion of said sump and extended substantially horizontally and connected to the lower portion of the boiler, and substantially vertical parallel plates connecting the upper and lower horizontal portions of said pipes and forming heat exchangers between said pipes.

2. In a refrigerating system of the class described, a boiler, an absorber mounted in spaced relation to the boiler at substantially the normal level of the liquid within the boiler, a substantially horizontally disposed pipe connecting the boiler and absorber, a pipe connecting the absorber with the lower portion of the boiler, and heat exchange plates connecting said pipes to provide means for conducting heat therebetween.

3. In an absorption refrigerating system, a boiler, an absorber, vertically spaced conduits connecting the boiler with the absorber at high and low levels respectively, and horizontally separated heat conducting members secured to and between said conduits for transmitting different temperatures between the tubes for progressive heating of one conduit and progressive cooling of the other, without substantial horizontal equalization of temperature.

NILS PERSSON.
SIGURD MATTIAS BÄCKSTRÖM.